United States Patent [19]
Sanders, III et al.

[11] Patent Number: 6,026,296
[45] Date of Patent: Feb. 15, 2000

[54] APPARATUS FOR PROVIDING DISPATCH SERVICE TO AN EXISTING TELEPHONE NETWORK

[75] Inventors: Stephen H. Sanders, III, Chicago; Paul M. Bocci, Roselle, both of Ill.

[73] Assignee: Motorola, Inc., Schaumburg, Ill.

[21] Appl. No.: 08/846,982

[22] Filed: Apr. 30, 1997

[51] Int. Cl.[7] .................................................. H04Q 7/20
[52] U.S. Cl. ........................... 455/426; 455/466; 455/520
[58] Field of Search ..................................... 455/416, 422, 455/426, 458, 466, 517–520, 560

[56] References Cited

U.S. PATENT DOCUMENTS

| | | | |
|---|---|---|---|
| 3,786,199 | 1/1974 | Rimbach, Jr. . | |
| 4,399,555 | 8/1983 | MacDonald et al. | 455/422 |
| 4,612,415 | 9/1986 | Zdunek et al. | 179/2 EB |
| 5,363,427 | 11/1994 | Ekstrom et al. | 455/426 |
| 5,371,898 | 12/1994 | Grube et al. | 455/426 |
| 5,408,466 | 4/1995 | Ablay | 370/24 |
| 5,465,391 | 11/1995 | Toyryla | 455/422 |
| 5,475,869 | 12/1995 | Kay et al. | 455/426 |
| 5,506,837 | 4/1996 | Sollner et al. | 455/518 |
| 5,548,631 | 8/1996 | Krebs et al. | 379/58 |
| 5,613,201 | 3/1997 | Alford et al. | 455/426 |
| 5,666,364 | 9/1997 | Pierce et al. | 455/518 |
| 5,678,180 | 10/1997 | Mehta et al. | 455/517 X |
| 5,711,011 | 1/1998 | Urs et al. | 455/520 |

OTHER PUBLICATIONS

"The GSM System for Mobile Communications", Mouly et al., pp. 294–297, 1992.
"The Short Message Service—A New Service of Digital Mobile Communication", M. Hientz et al. pp. 517–526 and translation, Sep. 1993.

*Primary Examiner*—William G. Trost
*Attorney, Agent, or Firm*—Daniel C. Crilly

[57] ABSTRACT

A dispatch controller (103) located logically external to an existing telephone network (101) is coupled to the existing telephone network. When an originating communication device (e.g., 111) desires to initiate a dispatch call, the originating device transmits a call request to the existing telephone network, wherein the call request includes an identification (ID) of the originating device and a target address associated with the dispatch controller. The existing telephone network provides the call request to the dispatch controller. Upon receiving the call request, the dispatch controller retrieves dispatch-related information from a database (105) coupled to the dispatch controller based on the originating device's ID. Based on the retrieved dispatch-related information, the dispatch controller identifies a group of target communication devices (e.g., 107–110) for the dispatch call. The dispatch controller then generates and sends control signals to the originating device and the group of target devices via the existing telephone network to establish and manage the dispatch call.

24 Claims, 3 Drawing Sheets

APPARATUS FOR PROVIDING DISPATCH SERVICE TO AN EXISTING TELEPHONE NETWORK

FIELD OF THE INVENTION

The present invention relates generally to telephone networks and, in particular, to providing dispatch service to an existing telephone network.

BACKGROUND OF THE INVENTION

Cellular and public-switched telephone networks are well known. Such networks generally include a pool of communication resources or channels that are individually allocated to permit network subscribers to communicate on a one-to-one basis. That is, one subscriber initiates a call to a single other subscriber. Upon allocation of a communication channel for each subscriber by the network infrastructure, the two subscribers communicate over the allocated communication channels. Upon termination of the communication (e.g., by hanging up the telephone or depressing the "END" key on a cellular telephone), the infrastructure de-allocates the communication channels and returns them to the pool for other users.

Although telephone networks adequately permit one-to-one communications, they do not quite so adequately permit group communications. One way telephone networks permit group calling is through three-way calling. In three-way calling, one subscriber must make two phone calls, one to each of the other parties to the three-way call, and must enter a key sequence into his or her own telephone that instructs the telephone to operate as a three-way conference bridge. Consequently, to effectuate a three-way call, a user must engage in activity above and beyond placing a single phone call. Moreover, three-way calling only permits three subscribers to communicate at any one time.

Conference calling is another known way in which telephone networks facilitate group calling. Conference calling requires all participants of the group call to place a telephone call to a conference bridge provider. The conference bridge provider then patches all the individual calls together to effectuate the group call. Although this approach permits group calls that include more than three participants, it requires intervention by the conference bridge provider and requires each participant to place a telephone call.

Dispatch radio communication systems are also known. Such systems provide dispatch or group calls automatically upon the initiation of a dispatch call by one the system subscribers. In addition, many such systems provide one-to-one telephone interconnect capability by including hardware and software that couples a dispatch system resource to a resource of the public-switched telephone network. Although such systems provide both one-to-one and group calls, such systems are independent and often privately owned, thereby limiting the public's accessibility to such systems. Also, since such systems are independent, they require a substantial capital investment in hardware and software to provide both one-to-one and group services. Moreover, such systems permit only one-half duplex telephone interconnect. Thus, in these systems, a telephone network subscriber must be cognizant of the fact that his or her transmission will not be received by the dispatch service subscriber if the dispatch service subscriber is also transmitting at the same time. If the telephone network subscriber is not so cognizant, information transmitted by the telephone network subscriber may not be received by the dispatch service subscriber or, at best, may have to be repeated and retransmitted.

Therefore, a need exists for an apparatus and method for providing dispatch or group call service to an existing public telephone network that permit a full duplex group call to be commenced effortlessly by the user of a subscriber and that do not require modification of the existing telephone network.

DESCRIPTION OF A PREFERRED EMBODIMENT

Generally, the present invention encompasses a method and apparatus for providing dispatch service to an existing telephone network. A dispatch controller located logically external to an existing telephone network is coupled to the existing telephone network. When an originating communication device desires to initiate a dispatch or group call, the originating communication device transmits a call request to the existing telephone network, wherein the call request includes an identification (ID) of the originating device and a target address associated with the dispatch controller. The existing telephone network then provides the call request to the identified target (i.e., the dispatch controller). Upon receiving the call request, the dispatch controller retrieves dispatch-related information from a database coupled to the dispatch controller based on either the originating device's ID or the target address. The dispatch-related information includes a talk group affiliation for the originating communication device. Based on the retrieved dispatch-related information, the dispatch controller identifies a group of target communication devices for the dispatch call. The dispatch controller then generates and sends control signals to the originating communication device and the group of target communication devices via the existing telephone network to establish and manage the group call. By establishing a group call in this manner, the present invention permits dispatch service (e.g., conference calling) to be added to existing public telephone networks, such as public switched telephone networks and cellular telephone networks, without requiring modifications to the existing telephone networks.

Figure 1:
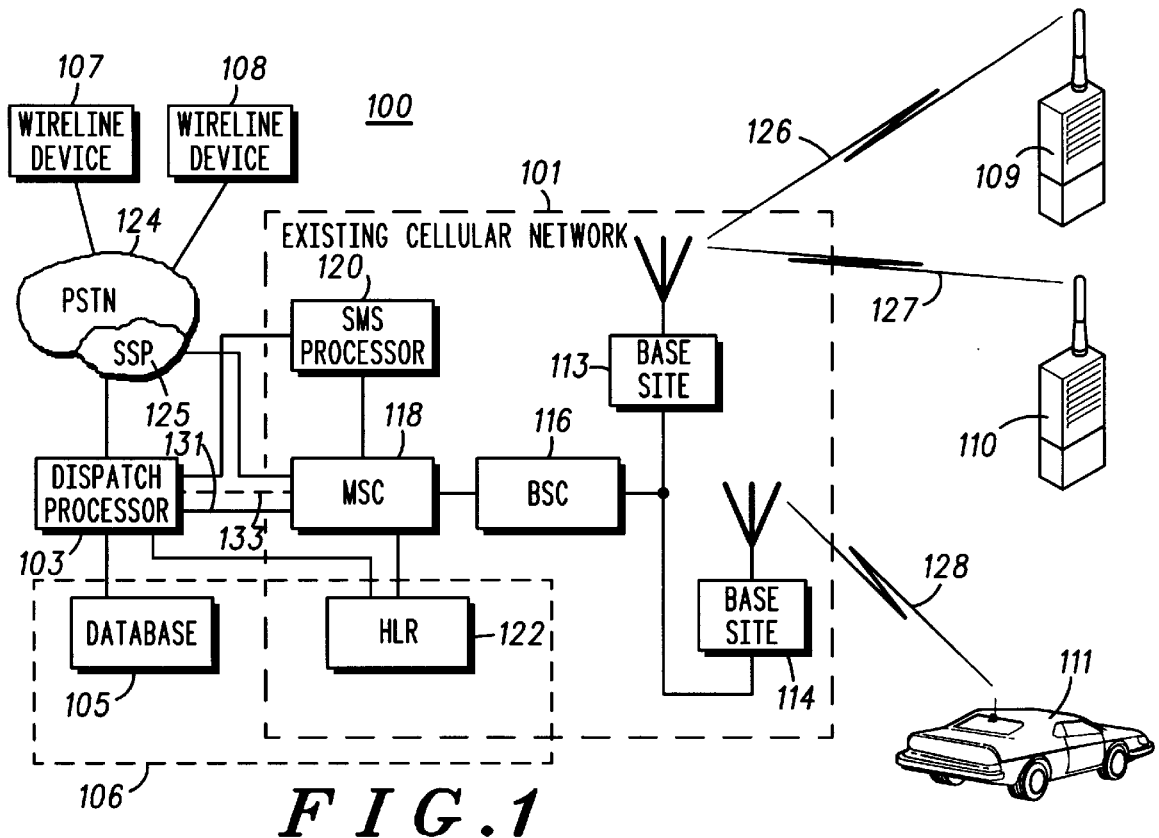
FIG. 1 illustrates a block diagram depiction of a dispatch communication system in accordance with a preferred embodiment of the present invention.

The present invention can be more fully understood with reference to FIGS. 1–6. FIG. 1 illustrates a block diagram depiction of a dispatch communication system 100 in accordance with a preferred embodiment of the present invention. The dispatch communication system 100 comprises an existing cellular telephone network 101, a dispatch controller 103, a database 105, an existing public switched telephone network (PSTN) 124, and a plurality of communication devices 107–111. The cellular telephone network 101 preferably comprises known infrastructure equipment supporting any one or more of a variety of cellular platforms, such as Personal Communication Service (PCS), Advanced Mobile Phone Service (AMPS), Narrowband AMPS (NAMPS), Unites States Digital Cellular (USDC), Code Division Multiple Access (CDMA), or Global System for Mobile Communications (GSM). The infrastructure equipment preferably includes a plurality of base sites 113, 114 (two shown), a base site controller 116, a mobile switching center (MSC) 118, a short message service (SMS) processor 120, and a Home Location Register (HLR) database 122. The infrastructure elements of the preferred existing cellular network 101 are well-known; thus, no further discussion of them will be presented except to facilitate an understanding of the present invention.

The PSTN 124 is also well-known and includes one or more switching service points (SSPs) 125. An SSP 125 is a location within the PSTN 124 where individual trunks are interconnected to establish full duplex PSTN communication links between PSTN devices. From the perspective of the PSTN 124, the wireline devices 107, 108, the dispatch controller 103, and the existing cellular network 101 (via its MSC 118) all constitute PSTN devices.

The communication devices 107–111 in the dispatch communication system 100 may comprise wireline devices 107, 108, such as standard or cordless telephones, wireless devices 109–111, such as cellular or other radiotelephones, or a combination of wireless and wireline communication devices (as shown in FIG. 1). The database 105 preferably comprises memory embodied in a disk and includes dispatch related information, such as talk group affiliations, dispatch-based target addressing translation, and dispatch service subscription information, such as supplementary services associated with dispatch, for the communication devices 107–111 in the system 100. In the preferred embodiment, the database 105 and the HLR 122 are integrated together into a single device 106. Thus, in the preferred embodiment, the MSC 118 is coupled to the HLR portion of the device 106 and the dispatch controller 103 is coupled to the database portion of the device 106. The preferred implementation of the dispatch controller 103 is described below with regard to FIG. 2.

Dispatch service is provided in the dispatch communication system 100 substantially as follows in accordance with the present invention. When a communication device (e.g., wireless device 111) desires to originate a dispatch or group call, the originating device transmits a call request signal to a base site 114 of the existing telephone network 101 that serves a coverage area containing the originating device 111. The all request signal is transmitted to the base site 114 over a control channel in accordance with known cellular call setup procedures; however, the target address of the call request is an address associated with the dispatch controller 103.

Upon receiving the call request signal, the base site 114 demodulates and decodes the call request signal to extract the call request information. The base site 114 then conveys the call request information to the BSC 116, which in turn provides the call request information to the MSC 118. The MSC 118 identifies the target address of the call request as the address of the dispatch controller 103 and routes the call request information to the dispatch controller 103 via a telephone user part (TUP) or an integrated services digital network user part (ISUP) link 131.

Upon receiving the call request from the MSC 118, the dispatch controller 103 establishes a first full duplex communication link 128 between the originating device 111 and the dispatch controller 103 and additional full duplex communication links 126–130 between the dispatch controller 103 and the target devices 107–110 to thereby establish full duplex communication links between the originating device 111 and the target devices 107–110. To establish the communication links, the dispatch controller 103 extracts the ID of the originating communication device 111 or the target address from the call request information and retrieves dispatch-related information (e.g., talk group affiliation) for the originating communication device 111 from the database 105 based on the originating communication device's ID or the target address. Based on the retrieved talk group affiliation, the dispatch controller 103 determines which communication devices 107–110 are members of the originating communication device's talk group. Upon determining the talk group members, the dispatch controller 103 generates control signals, such as connect signals and call request signals, and sends the control signals to the communication devices 107–111 in an appropriate sequence to establish the communication links.

For example, once the dispatch controller 103 receives the call request information from the MSC 118 and determines the talk group members, the dispatch controller 103 transmits a connect signal to the originating communication device 111 via the MSC 118, the BSC 116, and the serving base site 114 to establish the full duplex communication link between the dispatch controller 103 and the originating device 111. Since the originating communication device 111 is a wireless device, the connect signal preferably includes an identification of a full duplex radio channel 128 to be used as one communication link for the group call. Upon receiving the connect signal, the originating device 111 tunes to the identified radio channel 128.

In addition to establishing a communication link 128 with the originating device 111, the dispatch controller 103 establishes communication links 126, 127, 129, 130 with the target devices 107–110. To establish the links with the target wireless devices 109–110, the dispatch controller 103 transmits two call request signals (i.e., one call request signal per wireless target group member) to the MSC 118 via link 131, each call request signal identifying the dispatch controller 103 as the originator of the request and a respective wireless communication device (either device 109 or device 110) as the target of the request. The MSC 118 processes these call requests in accordance with known techniques and transmits the appropriate call request signal to the corresponding target communication device 109–110 via the BSC 116 and the appropriate base site 113 or base sites (e.g., when the target wireless devices are served by more than one base site). Each call request signal preferably includes an identification of a full duplex radio channel 126–127 to be used as the respective communication link for the group call.

Upon receiving its respective call request signal, each target device 109–110 transmits a connect signal over the system control channel (not shown) to the MSC 118 and tunes to the appropriate radio channel (either channel 126 or channel 127) identified in the call request signal. Each connect signal transmitted by a target wireless device 109–110 includes an ID of the particular target device 109–110. Upon receiving the connect signals, the MSC 118 forwards the connect signals to the dispatch controller 103 via link 131 to establish the full duplex communication links 126–127 between the target wireless devices 109–110 and the dispatch controller 103.

In an analogous manner, to establish the links with the target wireline devices 107–108, the dispatch controller 103 transmits two call request signals (i.e., one call request signal per wireline target group member) to the SSP 125, each call request signal identifying the dispatch controller 103 as the originator of the request and a respective wireline communication device (either device 107 or device 108) as the target of the request. The SSP 125 processes these call requests in accordance with known techniques and transmits the appropriate call request signal to the corresponding target communication device 107–108 via the PSTN 124 and selected wireline communication links 129–130. Upon receiving its respective call request signal, each target device 107–108 connects to its respective link 129–130 to establish the full duplex communication links 129–130 between the target wireline devices 107–108 and the dispatch controller 103.

In an alternate embodiment, the full duplex communication links between the dispatch controller 103 and the originating and target communication devices 107–111 may be established substantially in parallel when the MSC 118 supports an advanced intelligent network (AIN) link 133. In this case, the dispatch controller 103 subscribes to certain triggers in the MSC 118. When a certain trigger occurs (e.g., an ID of an originating device is one of a specified group or an ID of a target device is one of a specified group of target devices), the MSC 118 notifies the dispatch controller 103 of the trigger via the AIN link 133 before completing its standard call processing procedures. In this manner, the dispatch controller 103 can establish communication links with the target devices 107–110 while the MSC 118 is completing the call setup between the dispatch controller 103 and the originating device 111.

For example, when the MSC 118 receives a call request from the originating device 111, the MSC 118 determines whether a trigger for the dispatch controller 103 should be sent (e.g., based on the ID of the originating device 111) and, when such a trigger should be sent, sends a trigger signal to the dispatch controller 103 via the AIN link 133. Upon receiving the trigger signal, the dispatch controller 103 begins establishing full duplex communication links with the target devices 107–110 as described above. While the dispatch controller 103 is establishing the communication links with the target devices 107–110, the MSC 118 continues processing the call request and conveys the call request to the target identified therein (i.e., the dispatch controller 103) to enable the dispatch controller 103 to establish its full duplex communication link with the originating device 111 as described above. Using this approach, the communication links between the dispatch controller 103 and the communication devices 107–111 can be established in parallel by taking advantage of the multiple processing capabilities of the MSC 118 and, thereby, reducing the overall call setup time of the group call as compared to the overall call setup time of the group call when an AIN link 133 is not available.

As described in more detail below with regard to FIG. 2, the dispatch controller 103 includes a conference bridge that allows the dispatch controller 103 to bridge or merge communications carried on all the communication links between the dispatch controller 103 and the communication devices 107–111, thereby effectively producing a full duplex group link between the communication devices 107–111. Therefore, once the communication links are established between the dispatch controller 103 and all the communication devices 107–111, the group call is ready to be activated. In the preferred embodiment, the originating device 111 delays its voice or data transmission until it receives a clearance signal from dispatch controller 103 indicating that all necessary communication links have been established to target devices.

In an alternate embodiment, the originating communication device 111 might begin its transmission when at least one communication link to a target device has been established instead of waiting for the establishment of all links. Accordingly, in the alternate embodiment, target devices are preferably allowed to join an ongoing group call as their communication links are established. The need to join an ongoing group call may arise when a target device powers up or when a target device moves into a service coverage area of the system 100. At power-up or upon entering a service coverage area, the target device (e.g., 109) transmits a registration message to the serving base site 113 via a control channel (not shown) using well-known techniques. The base site 113 forwards the registration message to the dispatch controller 103 via the BSC 116 and the MSC 118. The dispatch controller 103 then accesses the database 105 to determine if the registering target device 109 is a member of a talk group that is presently engaged in a group call. If the registering target device is a member of such a talk group, the dispatch controller 103 establishes a full duplex communication link between the newly registered target device and the dispatch controller 103 as described above to thereby allow the new target device to join the ongoing group call. This call joining procedure can also be performed from a wireline device (e.g., 107) by placing a special call (e.g., "star" plus a dedicated number) to the dispatch controller 103 when the wireline device 107 becomes available to participate in the group call.

During the group call, all voice traffic is routed from a sender to the targets via the dispatch controller 103. For example, when the originating communication device 111 transmits information, the information is received and processed by the serving base site 114, the BSC 116, and the MSC 118 in accordance with known techniques. The MSC 118 then forwards the received information to the dispatch controller 103. The dispatch controller 103 bridges the originating device's transmission to the communication links of the target devices 107–110 in the originating device's talk group and retransmits the received information to the target devices 107–110 via either the PSTN 124, the existing cellular network 101, or both, as the particular case may be. The dispatch controller 103 might be required to convey the received information to a particular target device (e.g., 109) via both the PSTN 124 and the existing cellular network 101 when no direct connection exists between the dispatch controller 103 and the MSC 118. In this case, the existing cellular network 101 would provide information to and receive information from the dispatch controller 103 via the MSC's connection to the PSTN 124.

After the group call has been completed, the last communication device (e.g., communication device 111) to transmit user information transmits a release signal over the control channel to the dispatch controller 103 via the existing cellular network 101. The dispatch controller 103 then terminates its communication links with all communication devices 107–110 that are still participating in the group call and transmits control signals (e.g., release signals) to all the remaining communication devices 107–110 via the existing cellular network 101 to indicate the termination of the call. It should be noted that talk group members may leave the group call at any time during the call by transmitting a release signal to the dispatch controller 103 over the control channel.

In addition to dispatch or group voice communications, the present invention also facilitates dispatch or group short message service. In this case, when the originating communication device 111 transmits its call request, it also transmits the short message (e.g., status update, message update, emergency alarm, or call alert) that is to be conveyed to the target devices 107–110. Upon receiving the call request and the short message, the MSC 118 provides the call request and the short message to the SMS processor 120 in accordance with known techniques. The SMS processor 120 forwards the call request and the short message to the dispatch controller 103, which, in turn, establishes communication links between itself and the target devices 107–110 of the originating communication device's talk group as described above. Once the links are established, the dispatch controller 103 transmits the short message to the target devices 107–110 via the SMS processor 120 and the established links 126–127, 129–130.

As described above, the present invention permits dispatch service to be added to existing telephone networks without the need to modify the existing telephone networks. If desired, the communication devices 107–111 may be modified slightly to include ergonomics (e.g., a push-to-talk button) that facilitate easy access to the dispatch communication services. However, such communication device modification is not a requirement. With the addition of the dispatch controller 103 and the database 105, the present invention allows telephone system operators to provide dispatch or group call service to their subscribers without incurring additional infrastructure costs and without having to maintain a separate dispatch system. Furthermore, through utilization of the present invention, telephone network users can engage in both private and group calls without having to own or lease multiple communication devices to do so and without having to subscribe to multiple communication service providers.

Figure 2:
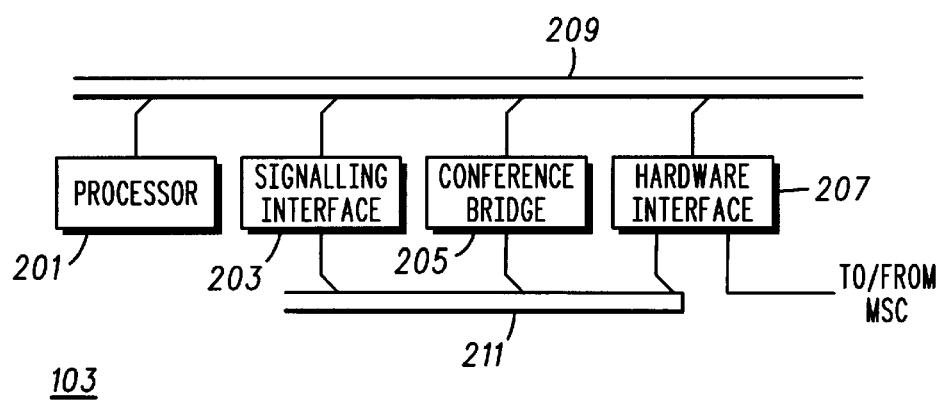
FIG. 2 illustrates a block diagram depiction of a dispatch controller in accordance with a preferred embodiment of the present invention.

FIG. 2 illustrates a block diagram depiction of a preferred embodiment of the dispatch controller 103 of FIG. 1. The dispatch controller 103 includes a processor 201, a telephony signaling interface 203, a conference bridge 205, a hardware interface 207, and at least one data bus (two shown) interconnecting the processor 201, the telephony signaling interface 203, and the conference bridge 205. The processor 201 preferably comprises a microprocessor or a digital signal processor. The telephony signaling interface 203 preferably comprises a known Signaling System 7 (SS7) interface. The conference bridge 205 is known and preferably comprises a commercially available conference bridge, such as an Alliance Generation Conference Board that is manufactured by Natural Microsystems, Inc. The hardware interface 207 preferably comprises a known T1 interface.

Operation of the preferred dispatch controller 103 occurs substantially as follows in accordance with the present invention. Upon receiving the call request from the originating communication device, the MSC 18 conveys the call request to the hardware interface 207, preferably via a T1 communication link. Upon receiving the call request, the hardware interface 207 provides the call request to the signaling interface 203 via data bus 211, which in-turn, utilizing SS7 protocol, provides the call request to the processor 201 via data bus 209. Responsive to the call request, the processor 201 accesses the database 105 to determine the targets of the requested call and then produces control signals (e.g., a connect signal and one or more call request signals) and a bridge signal. The control signals are conveyed via the signaling interface 203, data buses 209 and 211, and the hardware interface 207 to the MSC 118, the SSP 125, or the SMS processor 120 for subsequent transmission to respective communication devices (e.g., a connect signal is conveyed to the originating communication device and call request signals are conveyed to the target communication devices). The bridge signal is conveyed to the conference bridge 205 via data bus 209 and instructs the conference bridge 205 to merge communications received from the originating communication device with other communications received by the conference bridge 205. Thus, by the combination of connect and bridge signals generated and conveyed by the processor 201, a full duplex communication link is established between the originating communication device and the conference bridge 205.

Upon receiving connect signals from the target communication devices, one or more of the MSC 118, the SSP 125, and the SMS processor 120, as the case may be, conveys the connect signals to the processor 201 via the hardware interface 207, the signaling interface 203, and the data buses 209, 211. Responsive to the connect signals, the processor 201 generates bridge signals and conveys the bridge signals to the conference bridge via data bus 209. The bridge signals instruct the conference bridge 205 to merge communications received from the target devices with communications received from the originating communication device. Thus, full duplex communication links are established between the conference bridge 205 and the target communication devices. Once at least two or, in the preferred embodiment, all full duplex communication links are established, the originating communication device and the target communication device engage in their group call as described above.

Figure 3:
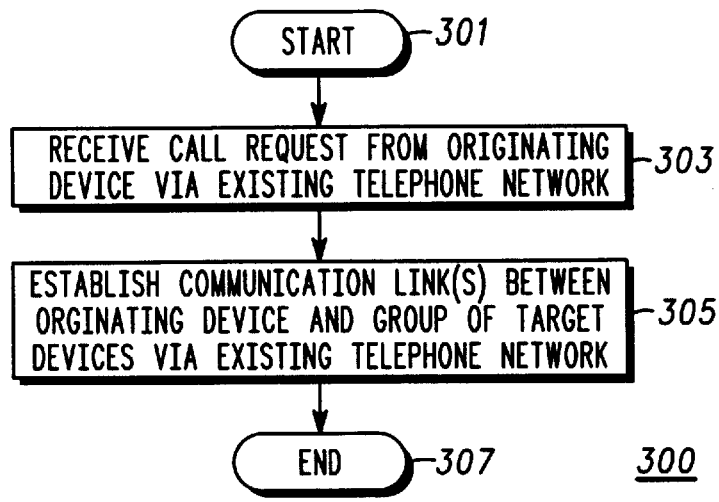
FIG. 3 illustrates a logic flow diagram of steps executed by a dispatch controller to provide dispatch service in accordance with the present invention.

FIG. 3 illustrates a logic flow diagram 300 of steps executed by a dispatch controller to provide dispatch service in accordance with the present invention. The logic flow begins (301) when the dispatch controller receives (303) a call request from an originating communication device via an existing telephone network. The call request includes information (e.g., ID of the originating device) from which the dispatch controller can identify, upon consulting a database, a group of target communication devices. Depending on the type of telephone network and the dispatch service requested, the dispatch controller receives the call request from either an MSC, an SMS processor, or an SSP. For example, when the originating communication device is a radiotelephone requesting dispatch voice service, the dispatch controller receives the call request from an MSC of a cellular telephone network; however, when the originating radiotelephone requests short message service, the dispatch controller receives the call request from an SMS processor of the cellular network. By contrast, when the originating communication device is a landline telephone requesting dispatch voice service, the dispatch controller receives the call request from an SSP of the PSTN.

The dispatch controller then establishes (305) communication links between the originating communication device and the group of target communication devices via the existing telephone network. As discussed above with regard to FIGS. 1 and 2, the link establishment includes transmission and reception of control signals to and from the communication devices involved in the group call. Once the communication links are established, the dispatch controller is ready to manage the group call and the logic flow ends (307).

Figure 4:
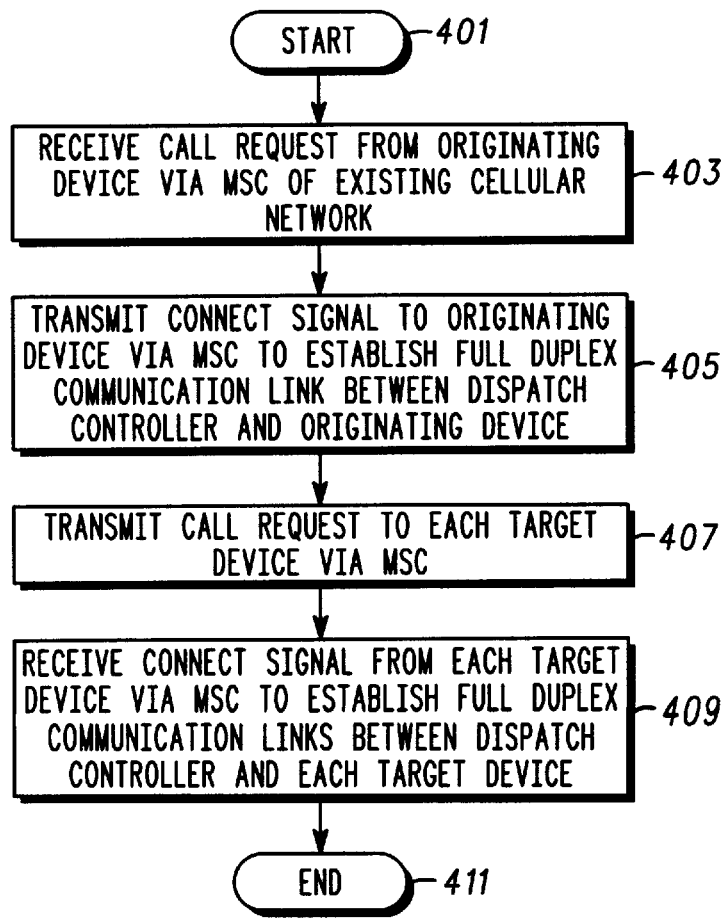
FIG. 4 illustrates a logic flow diagram of steps executed by a dispatch controller to provide dispatch service to an existing cellular telephone network in accordance with a preferred embodiment of the present invention.

FIG. 4 illustrates a logic flow diagram 400 of steps executed by a dispatch controller to provide dispatch service to an existing cellular telephone network in accordance with a preferred embodiment of the present invention. The logic flow begins (401) when the dispatch controller receives (403) a call request from an originating communication device via an MSC of an existing cellular telephone network. Responsive to the request, the dispatch controller transmits (405) a connect signal to the originating communication device via the MSC and other elements (e.g., BSC and base site) of the existing cellular network to establish a full duplex communication link between the dispatch controller and the originating communication device. As described above with regard to FIG. 2, signaling between the dispatch controller and the MSC is preferably performed using known SS7 protocol and the communication link is preferably established using a standard telephony protocol, such as pulse code modulation (PCM), to be compatible with the existing cellular telephone network.

In addition to establishing a communication link with the originating device, the dispatch controller establishes communication links with communication devices that are targets of the dispatch call request. The dispatch controller accesses a database to determine the IDs of the target devices to the requested dispatch call based on the originating device's ID or a target address of the dispatch controller contained in the call request, and transmits (407) its own call request to each of the target devices via the MSC and other elements of the existing cellular network. The dispatch controller then receives (409) connect signals from the target devices via the MSC to establish full duplex communication links between the dispatch controller and the target communication devices. Once the communication links have been established between the dispatch controller and the communication devices, virtual full duplex communication links exist between the originating and target communication devices and the logic flow ends (411).

Figure 5:
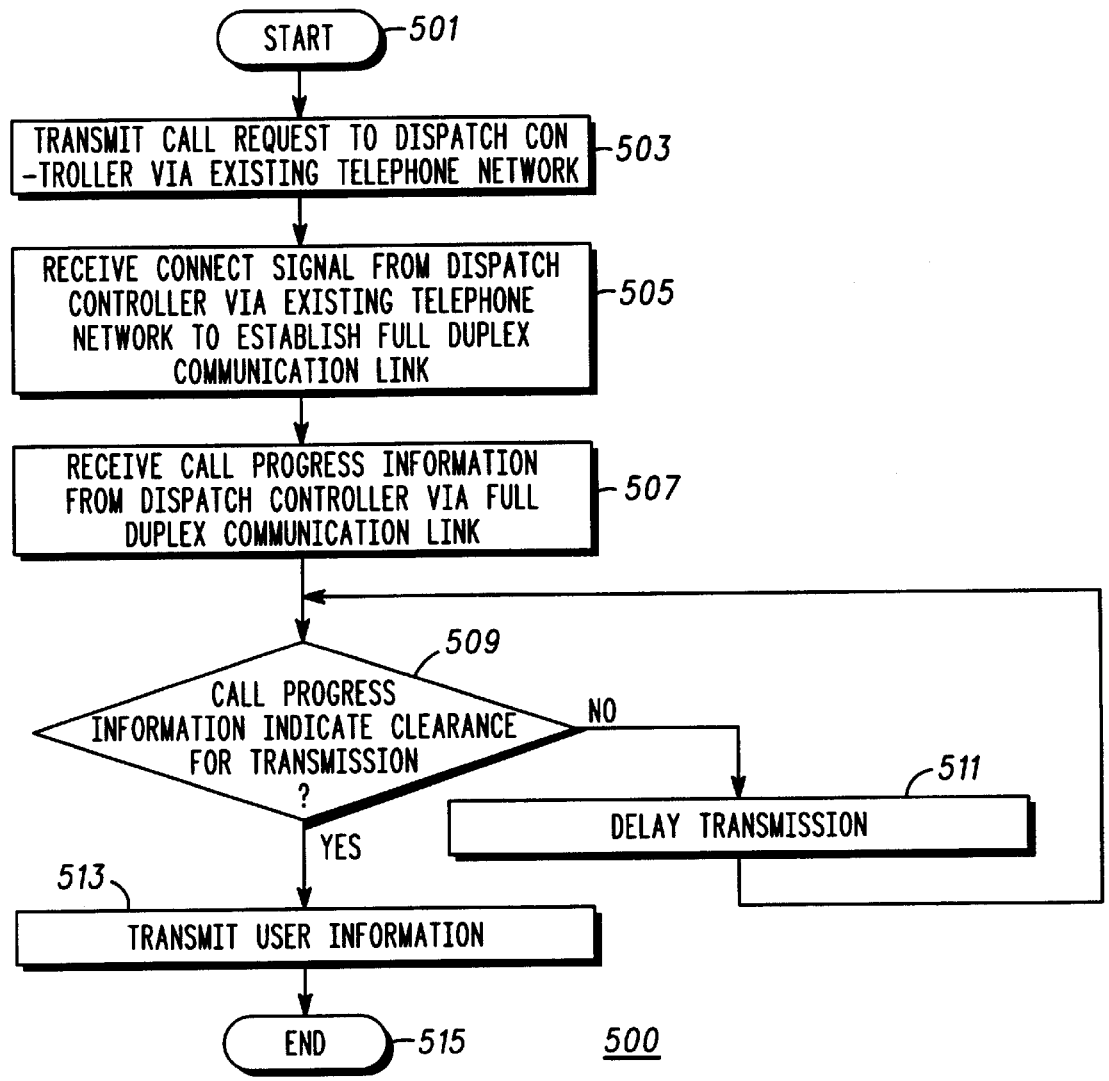
FIG. 5 illustrates a logic flow diagram of steps executed by a communication device in an existing telephone network to participate in a dispatch voice communication in accordance with a preferred embodiment of the present invention.

FIG. 5 illustrates a logic flow diagram 500 of steps executed by a communication device in an existing telephone network to participate in a dispatch voice communication in accordance with a preferred embodiment of the present invention. The logic flow begins (501) when the communication device transmits (503) a call request to the dispatch processor via the existing telephone network. In the preferred embodiment, a user of the communication device initiates the dispatch call request transmission by pressing one or more buttons on the keypad of the communication device. For example, the user might initiate a dispatch call by pressing the "function (FCN)" button and then the "star" button.

After processing of the request by the dispatch controller, the communication device receives (505) a connect signal from the dispatch controller via the existing telephone network, thereby establishing a full duplex communication link between the communication device and the dispatch controller. After establishment of the communication link, the communication device delays transmission of its information until it receives (507) call progress information from the dispatch processor via the full duplex communication link. The call progress information preferably indicates whether communication links have been established between the dispatch controller and target communication devices of the requesting communication device's talk group.

Upon receiving the call progress information, the communication device determines (509) whether the call progress information indicates clearance for transmission. The call progress information indicates clearance for transmission when it indicates that at least one full duplex communication link has been established between the dispatch processor and at least one target device. In the preferred embodiment, the call progress information indicates clearance for transmission when it indicates that full duplex communication links have been established between the dispatch controller and all available target devices that are members of the requesting communication device's talk group.

When the call progress information indicates clearance for transmission, the communication device transmits (513) user information (voice or data) to the target communication devices via the full duplex communication links and the dispatch controller and the logic flow ends (515). On the other hand, when the call progress information does not indicate clearance for transmission, the communication device delays (511) its transmission of user information until the call progress information includes a clearance indication.

Figure 6:
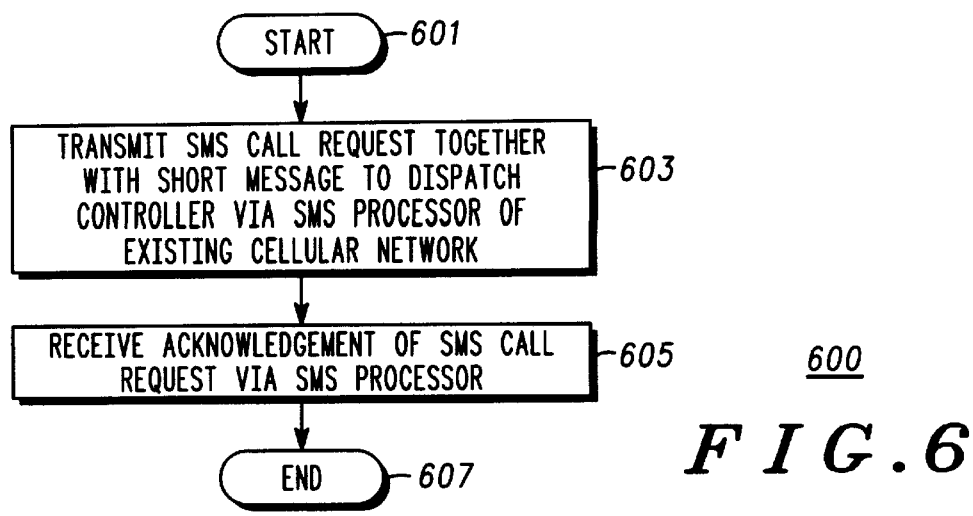
FIG. 6 illustrates a logic flow diagram of steps executed by a communication device in an existing telephone network to participate in a dispatch short message service communication in accordance with an alternate embodiment of the present invention.

FIG. 6 illustrates a logic flow diagram 600 of steps executed by a communication device in an existing telephone network to participate in a dispatch short message service communication in accordance with a preferred embodiment of the present invention. The logic flow begins (601) when the communication device transmits (603) an SMS call request together with a short message to a dispatch controller located logically, and preferably physically, external to the existing telephone network via an SMS processor of the existing telephone network. The SMS call request includes an ID of the communication device and an address of the dispatch controller. As described above, the dispatch controller utilizes the communication device's ID or a target address of the dispatch controller contained in the SMS call request to determine the communication device's talk group and associated talk group members. When the dispatch controller has received the SMS call request and short message, the communication device receives (605) an acknowledgment of the dispatch controller's receipt of the SMS call request and short message from the dispatch controller via the SMS processor. Upon receiving the acknowledgment, the communication device presumes that the short message was transmitted by the dispatch controller to the target communication devices and the logic flow ends (607).

The present invention encompasses a method and apparatus for providing dispatch service to an existing telephone network. With this invention, cellular and public-switched telephone users can engage in dispatch or group calls, or send short messages to a group of target users, with the simple press of a button or combination of buttons on their telephones, as opposed to requiring all participants of the group call to dial in to a commercial bridge provider. In addition, telephone service providers can offer dispatch services to their subscribers without incurring substantial infrastructure costs.

That is, with the present invention, telephone service providers that wish to add dispatch service capabilities need only add a couple of hardware elements to their existing systems, as opposed to having to add an independent, dedicated system for dispatch. Furthermore, the present invention provides full duplex dispatch communications between groups of communication devices, as opposed to the one-half duplex dispatch communications that are currently available from existing dedicated dispatch systems.

While the present invention has been particularly shown and described with reference to particular embodiments thereof, it will be understood by those skilled in the art that various changes in form and details may be made therein without departing from the spirit and scope of the present invention.

We claim:

1. A radio communication system comprising:

at least one base site;

a base site controller, coupled to the at least one base site;

a mobile switching center, coupled to the base site controller and a public-switched telephone network;

a dispatch controller, coupled to the mobile switching center, that provides control signals to a first radio communication device and at least a second radio communication device via the mobile switching center, the base site controller, and the at least one base site to establish and manage a group call between the first radio communication device and the at least a second radio communication device; and a database, coupled to the dispatch controller, that includes dispatch-related information for the first radio communication device to allow the dispatch controller to generate the control signals.

2. The radio communication system of claim 1, wherein the dispatch controller is directly connected to the mobile switching center.

3. The radio communication system of claim 1, wherein the dispatch controller comprises:

a processor that generates and terminates the control signals in response to signals received from the first radio communication device and the at least a second radio communication device via a telephony signaling interface;

a conference bridge that merges communications between the first radio communication device and the at least a second radio communication device during the group call responsive to bridge signals conveyed by the processor;

a data bus that interconnects the processor, the telephony signaling interface, and the conference bridge; and a hardware interface coupling the existing telephone network to the data bus.

4. The radio communication system of claim 3, wherein the hardware interface comprises a T1 interface.

5. The radio communication system of claim 1, wherein the dispatch-related information includes at least one group affiliation for the first radio communication device.

6. The radio communication system of claim 5, wherein the dispatch-related information further includes a group affiliation for the at least a second radio communication device.

7. The radio communication system of claim 1, wherein the dispatch controller is further coupled to a short message service processor.

8. The radio communication system of claim 7, wherein the group call is a short message.

9. The radio communication system of claim 8, wherein the short message is a status update, a message update, an emergency alarm, or a call alert.

10. The radio communication system of claim 1, wherein the dispatch controller is further coupled to a switching service point of a public switched telephone network.

11. The radio communication system of claim 1, wherein the group call is a full duplex voice call.

12. An apparatus for providing dispatch short message service to an existing cellular telephone network, the apparatus comprising:

a dispatch controller, coupled to a short message service processor of the existing cellular telephone network, that provides control signals to a first communication device and at least a second communication device via the short message service processor to allow a short message to be conveyed from the first communication device to the at least a second communication device; and a database, coupled to the dispatch controller, that includes dispatch-related information for the first communication device and the at least a second communication device to allow the dispatch controller to generate the control signals.

13. A communication system comprising:

a public-switched telephone network that includes a switching service point;

a dispatch controller, connected to the switching service point, that provides control signals to a first wireline communication device and at least a second communication device via the switching service point to establish and manage a group call between the first wireline communication device and the at least a second communication device; and a database, coupled to the dispatch controller, that includes dispatch-related information for the first wireline communication device to allow the dispatch controller to generate the control signals.

14. The communication system of claim 13, wherein the at least a second communication device comprises at least a second wireline communication device.

15. The communication system of claim 13, wherein the at least a second communication device comprises a wireless communication device.

16. The communication system of claim 13, wherein the dispatch controller comprises:

a processor that generates and terminates the control signals in response to signals received from the first wireline communication device and the at least a second communication device via a telephony signaling interface;

a conference bridge that merges communications between the first wireline communication device and the at least a second communication device during the group call responsive to bridge signals conveyed by the processor;

a data bus that interconnects the processor, the telephony signaling interface, and the conference bridge; and a hardware interface coupling the switching service point to the data bus.

17. The communication system of claim 16, wherein the hardware interface comprises a T1 interface.

18. The communication system of claim 13, wherein the dispatch-related information includes at least one group affiliation for the first wireline communication device.

19. The communication system of claim 18, wherein the dispatch-related information further includes a group affiliation for the at least a second communication device.

20. The communication system of claim 13, wherein the dispatch controller is further coupled to a mobile switching center of a cellular telephone network.

21. The communication system of claim 13, wherein the dispatch controller is further coupled to a short message service processor.

22. The communication system of claim 21, wherein the group call is a short message.

23. The communication system of claim 22, wherein the short message is a status update, a message update, an emergency alarm, or a call alert.

24. The communication system of claim 13, wherein the group call is a full duplex voice call.

* * * * *